United States Patent [19]
Schalk

[11] Patent Number: 5,557,051
[45] Date of Patent: Sep. 17, 1996

[54] DEVICE FOR MEASURING THE VELOCITY OF A FLUID FLOWING IN A FLOW CHANNEL OF A CONDUIT

[75] Inventor: Adelbert Schalk, Wutoschingen-Horheim, Germany

[73] Assignee: Georg Fischer Rohrleitungssysteme AG, Schaffhausen, Switzerland

[21] Appl. No.: 342,243

[22] Filed: Nov. 18, 1994

[30] Foreign Application Priority Data

Nov. 22, 1993 [CH] Switzerland ............... 03 480/93

[51] Int. Cl.$^6$ .................................................. G01F 1/32
[52] U.S. Cl. ................................ 73/861.22; 73/861.24
[58] Field of Search .......................... 73/861.24, 861.22

[56] References Cited

U.S. PATENT DOCUMENTS

| | | | |
|---|---|---|---|
| 4,326,422 | 4/1982 | Kobayashi et al. | 73/861.22 |
| 4,470,310 | 9/1984 | Tsuruoka et al. | 73/861.24 |
| 4,627,295 | 12/1986 | Matsubara et al. | 73/861.24 |
| 4,716,770 | 1/1988 | Herzog | 73/861.24 |
| 4,791,818 | 12/1988 | Wilde | 73/861.24 |
| 4,922,759 | 5/1990 | Steiner | 73/861.22 |
| 5,109,703 | 5/1992 | Tanimura et al. | 73/861.22 |
| 5,447,073 | 9/1995 | Kalinoski | 73/861.22 |

*Primary Examiner*—Hezron E. Williams
*Assistant Examiner*—Jewel V. Artis
*Attorney, Agent, or Firm*—Bachman & LaPointe, P.C.

[57] ABSTRACT

A Karman eddy flow meter includes a bending sensor mounted in an arm projecting into the flow channel of a conduit for measuring the velocity of a medium flowing through the conduit.

The sensor is encapsulated within the arm and is elongated in the direction of the medium flow within the flow channel of the conduit.

8 Claims, 3 Drawing Sheets

5,557,051

DEVICE FOR MEASURING THE VELOCITY OF A FLUID FLOWING IN A FLOW CHANNEL OF A CONDUIT

BACKGROUND OF THE INVENTION

The present invention is drawn to a device for measuring the velocity of a fluid flowing in a flow channel of a conduit.

Devices as aforesaid are known in the art under the name of Karman eddy counters. These devices have a element for disturbing fluid flow located in the flow channel of a conduit for generating eddies. The eddies cause pressure fluctuations in the frequency which are proportional to the rate of flow of the fluid in the flow channel. The pressure fluctuations generate charge differences which can be sensed by a piezoelement which sense conditions which are then evaluated and converted into voltage signals indicating flow measurement.

U.S. Pat. No. 5,109,703 discloses a Karman eddy flow meter of the type discussed above. The device comprises an eddy generating element in the form of a fluid flow disturbing body. Fluid pressure protecting openings are connected to a pressure sensor via a plurality of channels. A problem associated with the device of the '703 patent is the plugging of the channels which adversely affects the condition sensed by the pressure sensor. In addition to the foregoing, the insertion of the eddy generating element (the disturbing body) into the tubular mold part in combination with the location of the pressure sensor partially outside of the molded space results in a sealing problem in the unit.

It is the principle object of the present invention to create a device for measuring the velocity of fluid flow in a flow channel of a conduit employing a Karman eddy device which is of simple construction, easily mounted within the conduit without sealing problems, and which operates reliably and accurately over a wide range of flow velocities.

Further objects and advantages of the present invention will appear hereinbelow.

SUMMARY OF THE INVENTION

In accordance with the present invention the foregoing objects and advantages are readily obtained.

The present invention is drawn to a device for measuring the velocity of a fluid medium flowing through the flow channel of a conduit. In accordance with the present invention, the conduit includes an arm projecting into the flow channel. The piezoelement sensor is located within the arm and is elongated in the direction of the medium flow in the flow channel of the conduit. In addition to being located in an oblong manner with respect to the medium flowing through the conduit, the sensor has opposed flat sides extending parallel to the direction of medium flow. The device of the present invention as described above is inexpensive to manufacture, unitary in structure thereby eliminating sealing problems, and capable of measuring flow in both directions through the conduit.

DETAILED DESCRIPTION

Figure 1:
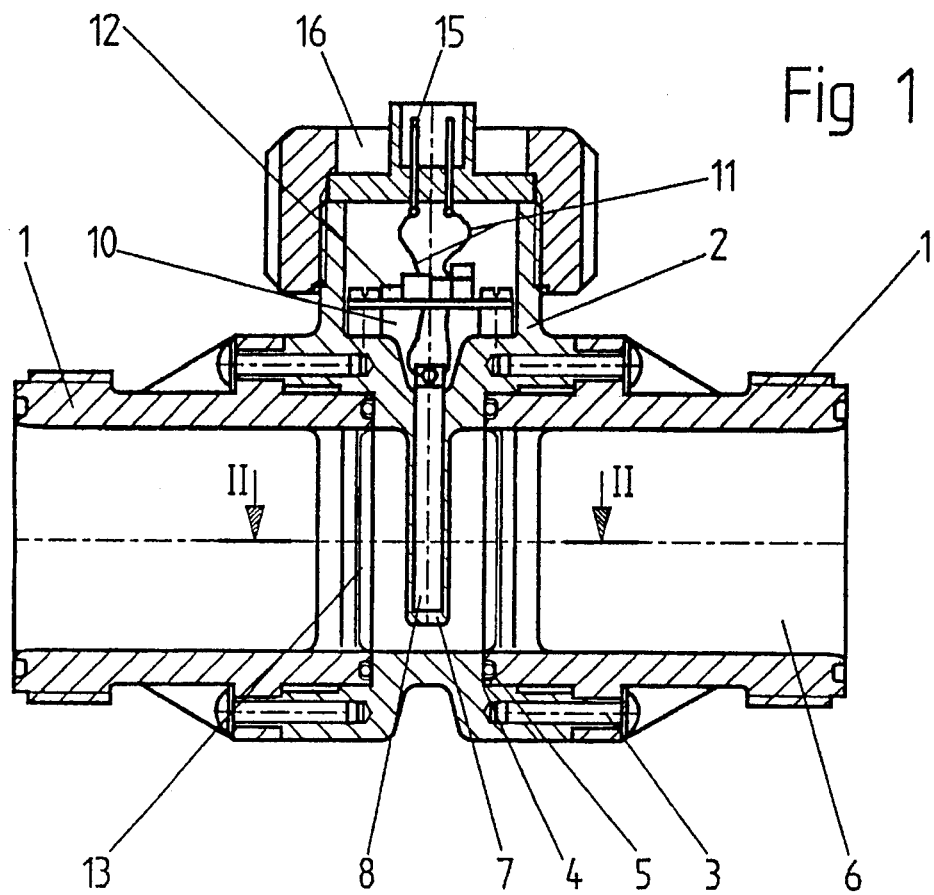
FIG. 1 shows a longitudinal section of a first specific embodiment of the device.
Figure 2:
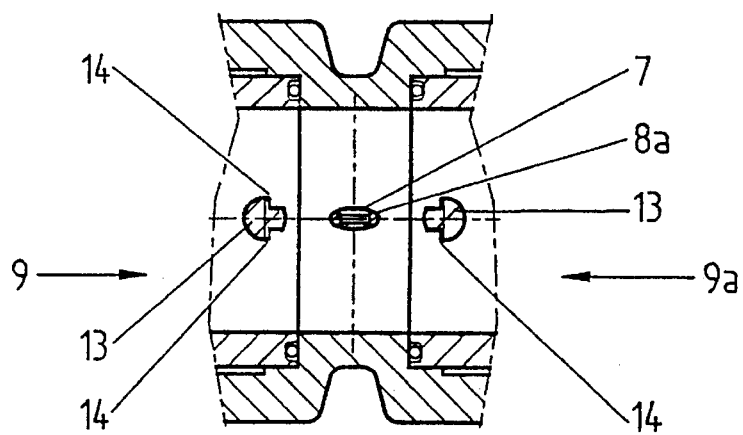
FIG. 2 shows a partial section along line II—II of FIG. 1.

FIGS. 1 and 2 illustrate a first embodiment of a device in accordance with the present invention. With reference to FIG. 1, the device comprises a molded piece 2 which is tightly clamped between two tubular parts 1 and held in place by means of screws 3. The end faces of the tubular parts 1 which abut the molding part 2 are provided with sealing rings 5 so as to provide a fluid tight seal between the tubular parts 1 and the molding part 2. The conduit formed by tubular parts 1 and molding part 2 define a flow channel 6 which is suitable for transporting any flowing medium such as for example liquid, vapor, gas and the like.

The molding part 2 is provided with a arm portion 7 which extends into the flow channel 6. As best seen in FIG. 2, the arm 7 is elongated in the direction of fluid flow (9 or 9a) and is substantially oblong in cross section. In a preferred embodiment as illustrated in FIG. 2 the arm 7 is a streamlined oval shape, however, it should be appreciated, that the arm may be rectangular in shape. As illustrated, the arm formed integral with the molding part 2. While it is desirable that the arm 7 be integral with the molding part 2, it is possible for the arm to be secured to the molding part in another matter such as threading or press fit if made separate. The piezo ceramic bending sensor 8 is located within the arm 7. The sensor 8 is rectangular in cross section. The sensor includes two opposed flat surfaces which run parallel to the direction of the fluid flow in the flow channel 6. As illustrated in FIG. 2, the sensor is surrounded and contacted on all sides by the material of arm 7 without any intermediate space. The sensor may be molded during the injection molding projection process right into the plastic molded part 2.

The flow channel 6 of the device of the present invention and particularly the tubular parts 1 may each be provided with a flow disturbing body 13 for generating eddies. Each of the disturbing bodies 13 is provided with edges 14 which generate alternating eddies downstream thereof by means of the instant flow of the fluid pass the disturbing body. With reference to FIG. 2, as the disturbing bodies are located on either side of sensor 8, the flow of fluid in the fluid channel may be monitored regardless of the direction of flow be it either in the direction of arrow 9 or in the direction of arrow 9a.

The eddies generated by the disturbing means 13 cause pressure fluctuations in the frequency which are proportional to the rate of flow of the fluid in the fluid channel. The sensor 8, which is displaced in bending oscillations transverse to the direction of fluid flow, is located in a region of the pressure fluctuations. The bending of the sensor 8 generates an electrical signal which is monitored via electronic unit 12, lines 11 and electrical plug connection 15 so as to generate an indication of fluid flow in a manner well known in the art.

Figure 3:
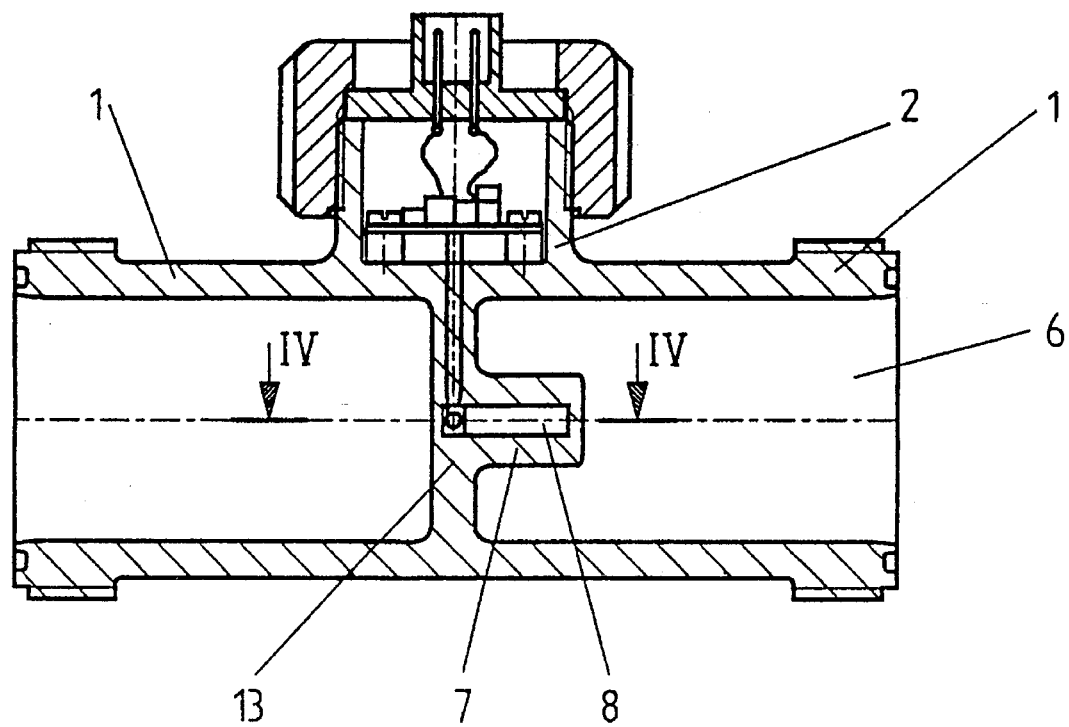
FIG. 3 shows a longitudinal section of the second design version of the device.
Figure 4:
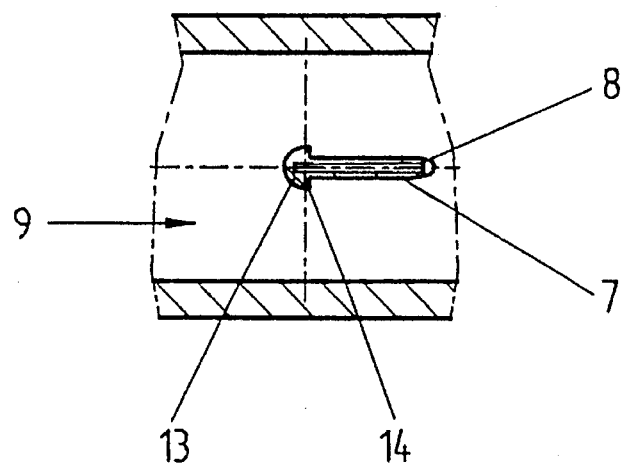
FIG. 4 shows a partial section along the line IV—IV of FIG. 3.

FIGS. 3 and 4 illustrate a second embodiment of a device in accordance with the present invention. In accordance with the design of the device of FIGS. 3 and 4 the mold piece is made integral with tubular parts 1. The arm traverses the tubular parts 1 and holds bending sensor 8. The disturbing element 13 is made integral with the arm for generating the eddies in the manner discussed above. The device of FIGS.

3 and 4 can only measure fluid flow in one direction, the direction of arrow 9 in FIG. 4. The device of FIGS. 3 and 4 offers the advantage of being made of a single one piece construction which eliminates any sealing problems.

Figure 5:
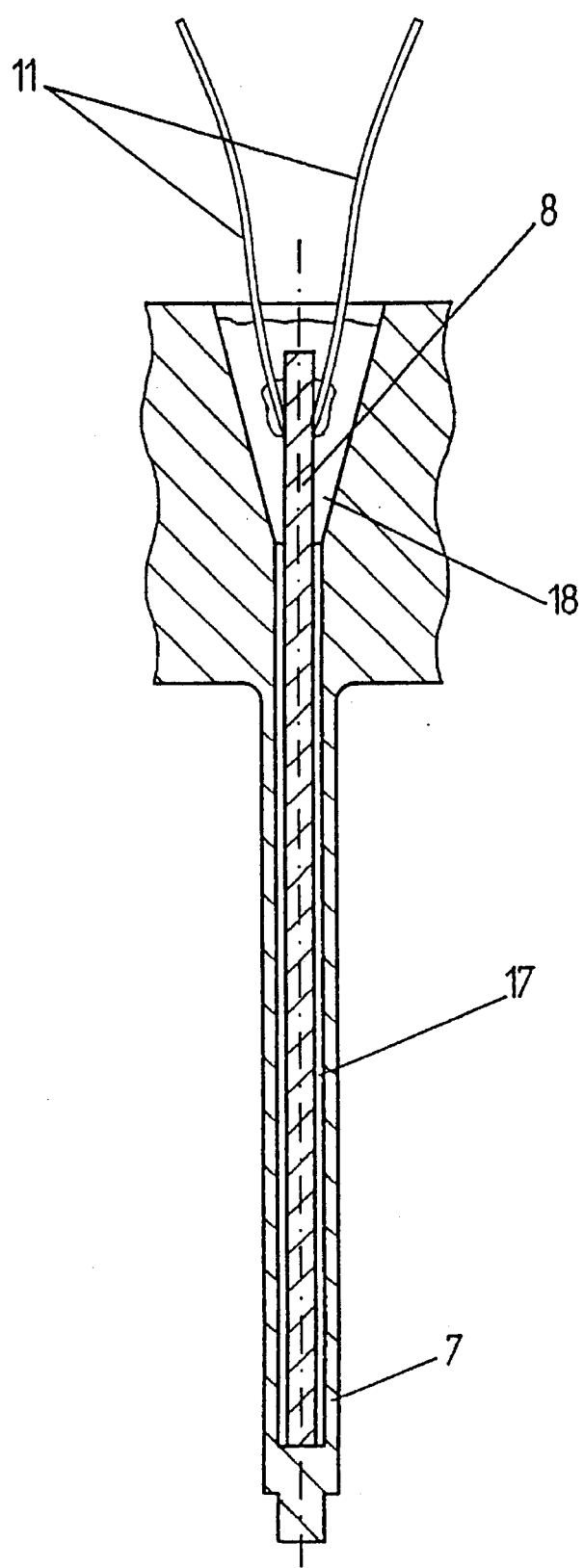
FIG. 5 shows a magnified representation of a design version of the arrangement of the bending sensor shown in FIG. 1.

FIG. 5 shows a design version of the bending sensor 8 which may be used with the device of FIGS. 1 and 2 described above. With reference to FIG. 5, the sensor may be located within the arm 7 which is provided with a recess 17. The sensor 8 defines with the arm 7 a space which, in accordance with the present invention, is completely filled with an acoustically conducting, electrically insulating material. Alternately, it is possible to fix the sensor within the recess 12 at either its upper or lower end. Finally, by shrink fitting the arm 7 around the sensor 8 the space between the elements may be eliminated.

The device of the present invention is of simple construction, economic to manufacture, and substantially free of sealing problems.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim:

1. In a conduit defining a flow channel for transporting a flowing medium in a first direction, a device including a bending sensor for measuring the velocity of the medium flowing through the conduit, the improvement comprising: flow disturbing means located in the flow channel for generating eddies which cause pressure fluctuations having frequencies which are proportioned to the velocity of the medium flowing through the conduit and an arm projecting into the flow channel downstream of the flow disturbing means with respect to said first direction wherein the bending sensor is located within and encapsulated by the arm, is elongated in the direction of the medium flow for sensing the pressure fluctuations on the arm resulting from said eddies to determine the velocity of the medium flowing through the conduit.

2. A device according to claim 1 wherein the sensor is received in an oblong recess provided in the arm and the intermediate space defined between the arm and the sensor is filled with an acoustically conducting, electrically isolating material.

3. A device according to claim 1 wherein the sensor is received in an oblong recess of the arm and located therein without intermediate space by means of a shrinking process.

4. A device according to claim 1 wherein the conduit is plastic and the sensor is coated with the plastic of the conduit.

5. A device according to claim 1 wherein a disturbing body is located in the flow channel upstream of the sensor with respect to the first direction.

6. A device according to claim 5 wherein the disturbing body is mounted on the arm.

7. A device according to claim 5 wherein the conduit includes a molded piece having the projecting arm wherein the molded piece is tightly clamped between two tubular parts, at least one of the tubular parts having a disturbing body.

8. A device according to claim 1 wherein the sensor is made so that there is a distribution of the bending over the entire length of the sensor.

\* \* \* \* \*